US005175045A

United States Patent [19]

Henry et al.

[11] Patent Number: 5,175,045

[45] Date of Patent: Dec. 29, 1992

[54] RECEPTOR SHEET FOR THERMAL MASS TRANSFER IMAGING

[75] Inventors: Robert M. Henry, Round Rock; Mohammed Iqbal; Donald J. Williams, both of Austin, all of Tex. Patricia J.A. Brandt, Woodbury, Minn.

[73] Assignee: Minnesota Mining and Manufacturing Company, St. Paul, Minn.

[21] Appl. No.: 749,657

[22] Filed: Aug. 26, 1991

[51] Int. Cl.[5] .............................................. B32B 9/00

[52] U.S. Cl. .................................. 428/195; 428/207; 428/212; 428/488.1; 428/488.4; 428/913; 428/914; 503/227

[58] Field of Search ................. 428/195, 488.1, 488.4, 428/913, 914, 207, 212; 346/227; 503/227

[56] References Cited

U.S. PATENT DOCUMENTS

| | | | |
|---|---|---|---|
| 3,898,086 | 8/1975 | Franer et al. | 96/28 |
| 4,572,684 | 2/1986 | Sato et al. | 400/240 |
| 4,686,549 | 8/1987 | Williams et al. | 503/227 |
| 4,847,237 | 7/1989 | Vanderzanden | 503/227 |

FOREIGN PATENT DOCUMENTS

| | | |
|---|---|---|
| 0365307 | 4/1990 | European Pat. Off. . |
| 3143320 | 11/1983 | Fed. Rep. of Germany . |

*Primary Examiner*—Patrick J. Ryan
*Assistant Examiner*—W. Krynski
*Attorney, Agent, or Firm*—Gary L. Griswold; Walter N. Kirn; Darla P. Neaveill

[57] ABSTRACT

A receptor sheet for thermal mass transfer imaging comprising a polymeric image-receptive layer comprising a polymer having a melt transition onset no higehr than the melting point of a compatible doner sheet wax, and having a melt viscosity at the melt temperature of said donor sheet wax of at least $1\times10^4$ poise.

15 Claims, 3 Drawing Sheets

RECEPTOR SHEET FOR THERMAL MASS TRANSFER IMAGING

FIELD OF THE INVENTION

The invention relates to thermal mass transfer imaging, and in particular to a polymeric film-backed novel receptor sheet for such imaging.

DESCRIPTION OF THE RELATED ART

In thermal mass transfer imaging or printing, an image is formed on a receptor sheet by selectively transferring image-forming material thereto from a donor sheet. Material to be transferred from the donor sheet is selected by a thermal printhead, which consists of small, electrically heated elements which are operated by signals from a computer in order to transfer image-forming material from the donor sheet to areas of the receptor sheet in an image-wise manner.

In mass transfer systems, the image is formed simply by the transfer of the coloring material rather than by a color-forming chemical reaction as in chemical reaction, or "dye-transfer" imaging systems.

U.S. Pat. No. 3,898,086, a wax composition is transferred imagewise to a receptor film by means of heat which melts the wax and allows it to readhere upon cooling, to the receptor film. The final step is the manual separation of the donor sheet and receptor sheet. The donor sheet, which bears a negative image, is then used as a visual transparency. The receptor film used in this process is not useful for projection due to lack of sufficient transparency.

In DE 3,143,320, pressure rather than heat is used to transfer the wax to the receptor sheet. The pressure may be applied using a pencil, typewriter, or other tool. This system is not useful in the current thermal printing systems.

A typical donor sheet for use with the modern thermal printers is a layer of pigmented wax, coated onto a paper or film backing. U.S. Pat. No. 4,572,684 discloses thermal printing sheets for development of a multicolor image by means of overlap of colors. The layer of transfer material is disclosed to contain 1 to 20% coloring agent, 20% to 80% binder, and 3% to 25% softening agent. A solid wax having a penetration index of 10 to 30 is a preferred binder. The softening agent should be an easily meltable material such as polyvinyl acetate, polystyrene, and the like.

U.S. Pat. No. 4,847,237, Vanderzanden, discloses a kit for thermal mass transfer printing. The kit includes an image-donating sheet and an image-receptive sheet. The donor-receptor combination disclosed herein are capable of producing transparent images having clear vivid colors when viewed in the projection mode. Waxes and other haze producing ingredients are eliminated from the image-donating sheet. Unlike typical systems, softening of the image-donating sheet is not required. Softening of the receptor sheet alone or of both sheets is disclosed to be efficacious.

U.S. Pat. No. 4,686,549, Williams, discloses a polymeric film receptor sheet for thermal mass transfer. The image receptive coating must be wax-compatible, and have a softening temperature of from about 30° C. to about 90° C., and a higher critical surface tension than the donor material. The haze value of the receptor sheet must be less than 15%. Preferred coating compositions include polycaprolactones, chlorinated polyolefins, and block copolymers of styrene-ethylene/butylene-styrene. Polyethylene terephthalate is disclosed to be a preferred backing.

SUMMARY OF THE INVENTION

The invention provides a receptor sheet for thermal mass transfer imaging comprising a polymeric image-receptive layer containing at least about 5% of an image-receptive polymer having a melt transition onset no higher than the melting point of a donor sheet wax, and having a melt viscosity at the donor sheet wax melt temperature of at least $1\times10^4$ poise.

Receptor sheets of the invention are capable of producing transparent images having exceptionally small dots with no overprinting. (Overprinting occurs when dots spread and merge in the half tone area.) This yields an image with highly improved clarity in the half tones area.

Preferred receptor sheets of the invention comprise an image-receptive polymer having a melt viscosity at the donor sheet wax melt temperature of at least $1\times10^5$ poise.

Highly preferred receptor sheets of the invention comprise an image-receptive polymer having the following formula:

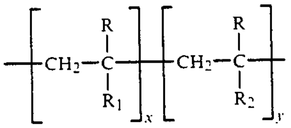

where R is selected from hydrogen or an alkyl group having 10 or fewer carbon atoms, an aryl group or alkyl substituted aryl group wherein the alkyl group has 10 or fewer carbon atoms, where $R_1$ is a pendant group selected from the group consisting of:

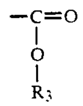 and 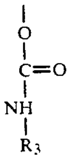

where $R_3$ is a long chain alkyl group having from about 14 to about 38 carbon atoms, where $R_2$ is selected from the group consisting of $R_1$,

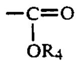 and 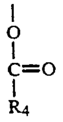

where $R_4$ is a short chain alkyl group having from 1 carbon atom to 15 carbon atoms.

where x, and y are numbers related in that x+y comprises 100% of the polymer; x is from about 25% to about 100% of the final polymer, and y is from 0 to about 75% of the final polymer, preferably x is from about 25% to about 95%, and y is correspondingly about 5% to about 75%.

The invention also provides receptor sheets wherein the image-receptive layer additionally comprises a carrier polymer for said image-receptive polymer.

The following terms having these meanings when used herein.

1. The term "melt transition temperature" means the onset of melting as measured by Differential Scanning Calorimetry.

2. The term "melt viscosity" means real part of viscosity of melted fluid, as measured by dynamic Oscillatory techniques at low shear rate.

All percents, parts, and ratios used herein are by weight unless specifically stated otherwise.

DETAILED DESCRIPTION OF THE INVENTION

Figure 1:
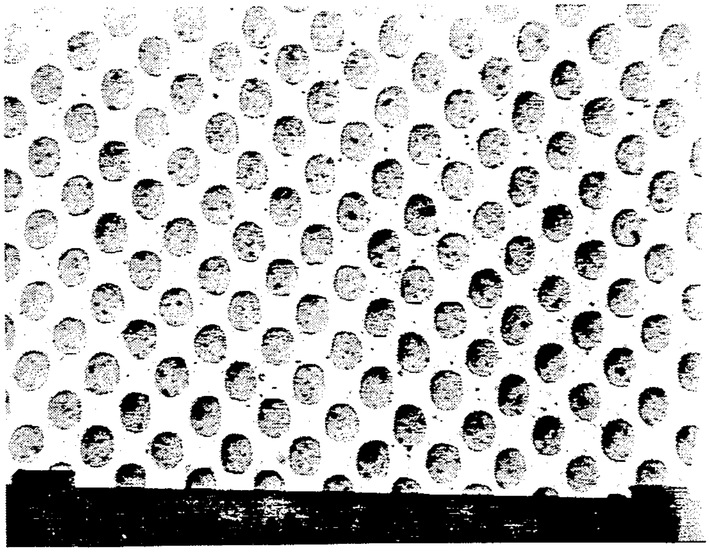
FIG. 1 shows a receptor sheet of the invention which has been printed on a 200 dot per inch Calcomp Colormaster 5902 printer in an alternating cyan half-tone and alternate dots pattern, as described in Test Methods, infra. The image-receptive layer consists of the blend of 9% image-receptive polymer and 91% carrier polymer described in Example 1. The dots are distinct and separate, with no overprinting.

Useful image-receptive polymers for receptor sheets of the invention include polymers having the basic formula:

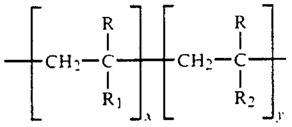

where R is selected from hydrogen or an alkyl group having 10 or fewer carbon atoms, an aryl group or alkyl substituted aryl group wherein the alkyl group has 10 or fewer carbon atoms, where $R_1$ is a pendant group selected from the group consisting of:

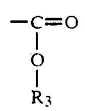
and
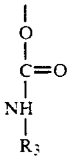

where $R_3$ is a long chain alkyl group having from about 14 to about 38 carbon atoms, preferably 14–18, where $R_2$ is selected from the group consisting of $R_1$,

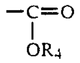
and
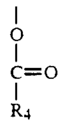

where $R_4$ is a short chain alkyl group having from 1 carbon atom to 15 carbon atoms where x, and y are numbers related in that x+y comprises 100% of the polymer; x is from about 25% to about 100% of the final polymer, and y is from 0 to about 75% of the final polymer. Preferably x is from about 25 % to about 95% of the final polymer, and y is correspondingly from about 5% to about 75% of the final polymer. However, when $R_4$ is methyl, then Y comprises less than 50% of the final polymer for optimal print quality.

The image-receptive layer may be solely comprised of the image-receptive polymer which can be a homopolymer polymerized from alkyl acrylates and methacrylates having the general structure,

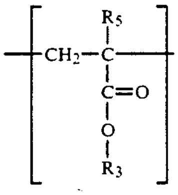

where $R_5$ represents hydrogen or $-CH_3$ and $R_3$ represents a member selected from the group consisting of alkyl group having from about 14 to about 38 carbon atoms, preferably from about 14 to about 18 carbon atoms.

The image-receptive polymer can also be copolymerized with the following additional monomers: Vinyl acetate, and vinyl benzene, α-methyl vinyl benzene having the formula:

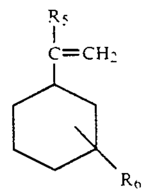

where $R_5$ represents hydrogen or $-CH_3$ and $R_6$ is selected from the group consisting of alkyl groups having up to 18 carbon atoms, halogen, hydroxide groups, alkoxy groups, acetyl groups and hydroxyalkyl groups, and can appear at the ortho, meta or para position to a vinyl group. The para position yields preferred structure.

Surprisingly, the image-receptive polymer is somewhat incompatible with "Histowax" HX 0482-5, a paraffin wax, when tested as described in U.S. Pat. No. 4,686,549, (Williams et al.), incorporated herein by reference. In this test, 20 grams of wax are dissolved in 80 grams of hot toluene. In a second container, 20 grams of the image-receptive polymer is dissolved in 180 grams of toluene. The two solutions are then mixed and coated onto polyester film at about 16 micrometers wet thickness with a wire wound coating rod, then dried with hot forced air at about 82° C. The image-receptive polymer being tested is deemed to be compatible with wax if the haze of the resulting coating is less than 15% when measured with a Gardner "Model HD 1200" pivoting sphere hazemeter or the like. When the image-receptive layers useful in the instant invention are tested in a receptor sheet comprising more than 25% "Histowax", the resultant coatings are extremely hazy signaling incompatibility with this wax. This would seem to indicate that these polymers would not be useful as image-receptive polymers as they would be expected to yield hazy images as most commercially available donor sheets are based on some type of wax. Surprisingly, the use of these polymers as image receptive polymers produce receptor sheets yielding high quality, clear images having distinct separated dots with no overprinting when tested in alternating dot pattern, as described herein, infra. Because of this wax-incompatibility, no more than 25% Histowax can be included in the image-receptive layer. Receptor sheets of the invention are particularly sensitive to small dots and thin lines.

Figure 5:
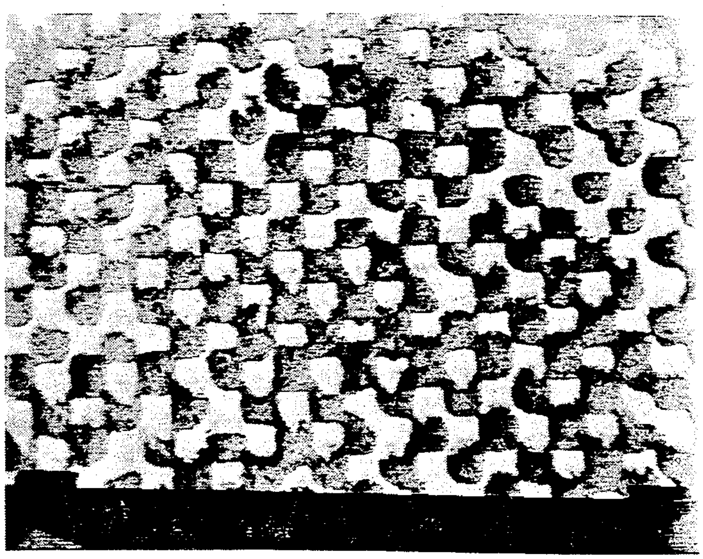
FIG. 5 shows a comparative receptor sheet having been printed as described for FIG. 1. The image-receptive layer consists of a carrier polymer as described in Example C3. Note the large areas of overprinting where each type of dot (cyan, half-tone) runs together to form large indistinct areas.

In one embodiment of the invention, the receptor sheet further contains a carrier polymer for the image-receptive polymer. In addition, carrier polymers are film forming and by themselves are suitable as image-receptive layers in applications where overprinting is not objectionable, e.g., in certain typical dot patterns such as those shown in FIG. 5. The use of a carrier polymer may result in easier coating of the image-receptive layer, as well as lessening the amount of haze when thick layers are desirable. Judicious selection of a carrier polymer will also result in lower cost.

Carrier polymers may be selected from film-forming polymers such as ethylene bisphenol-A copolymers, such as those commercially available from E.I. DuPont Corporation (DuPont) as Atlac TM 382-05, copolyesters such as the Vitel TM PE 200, and PE 222, both commercially available from Goodyear Tire and Rubber Company, polyvinyl butyral, available as Butvar TM B72 and B76, available from Monsanto, polyvinylidene chloride acrylonitrile copolymers, available as Saran TM F310 from Dow Chemical, and polymethylmethacrylate, available as Elvacite TM 2041 from DuPont.

Preferred carrier polymers include Vitel TM PE200, and polyvinyl butyral, and PMMA.

When present, the carrier polymer comprises up to about 95% of the image-receptive layer, more preferably from about 50% to about 91%.

The image-receptive layer is typically coated to a thickness of from about 1.5 microns ($\mu$) to about $15\mu$.

Backings useful in receptor sheets of the invention include paper and any flexible, polymeric material to which an image-receptive layer can be adhered. Flexibility is required so that the receptor sheet will be able to travel through conventional thermal mass transfer printers. Whenever the receptor sheet is to be used in the preparation of transparencies for overhead projection, the backing must be transparent to visible light. Useful backing materials include polyesters, polysulfones, polycarbonates, polyolefins, polystyrene, cellulose esters, and polyethylene terephthalate. Polyethylene terephthalate is a preferred backing material. The caliper of the receptor sheet can range from about 25 $\mu$ to about 125 $\mu$, preferably from about 50 $\mu$ to about $75\mu$.

Adhesion of the image-receptive layer to the backing is critical to the performance of the receptive sheet. Transfer from the donor sheet to the image receptive layer is effectual only if the anchoring of the image-receptive layer to the backing is strong enough to hold the image-receptive layer thereon. The image-receptive layers of the invention show good adhesion to the commonly used backings. However, if desired, the backing can either be surface treated for adhesion enhancement, or an adhesion enhancer can be coated onto the image-receptive layer.

The receptor sheet of the invention is useful in any thermal mass transfer imaging system, and may be produced in a variety of commercial embodiments.

For example, the visual may be produced with or without a "tab", e.g., an opaque sheet for facilitating feeding of the receptor sheet into thermal mass transfer printing apparatus, as described in EP 052,938, incorporated herein by reference.

In an alternative preferred embodiment, the receptor sheet may be coated with the image-receptive layer on one side of the sheet, with the other side being treated with an antistatic composition. Preferred antistatic compositions include perfluoroalkylsulfonamidopolyether derivatives of the following formula:

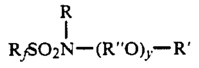

wherein R and R' are independently selected from the group consisting of hydrogen, alkyl, aryl, aralkyl, alkaryl, aminoalkyl, hydroxyalkyl, maleiamide, alkoxy, allyl and acryoyl, R and R' not being identical groups, and at least one of R and R' being a vinyl group; R" is selected from ethyl and isopropyl groups, and $R_f$ is a perfluorinated linear or branched alkyl group containing up to about 30 carbon atoms, said alkyl group containing an extended fluorocarbon chain, said chain being both hydrophobic and oleophobic.

Variations such as adjuvants, or additional layers may also be added where desirable, i.e., to ease cassette feed.

Receptor sheets of the invention can be prepared by mixing the image-receptive polymer into a suitable solvent system, coating the mixture onto the backing, and drying in an oven. Coating techniques include curtain coating, knife coating, bar coating, and the like.

The receptor sheet is useful with all conventional thermal mass transfer apparatus, such as "Fuji Xerox Diablo" Model XJ-284 and "Okimate" models, Calcomp "Colormaster", Tektronix "Phaser" PX Model 5902, and NEC "Colormate PS".

Test Methods Dot Measurement Procedure

A common test pattern generated on a 200 dots/inch Calcomp Colormaster 5902 printer with alternate and cyan half-tone dots, as shown in the figures, was used for the print dot size measurements. A receptor sheet having the desired image-receptive layer was printed with this test pattern. After printing, the receptor was placed on the stage of a Zeiss-Kontron Image Analysis System from Kontron Gmbh. The system included a Zeiss Optical microscope, a video camera with computer interface, and a "80386-22" IBM compatible computer. The software for dot analysis included capability for threshold adjustments for locating the dot perimeter, rejecting partial dots at the edge of a video frame and a statistical package for calculating the size distribution. The entry of a magnification factor calibrated the image size for one dot pattern, and the statistical analysis package then determined the dot diameter distribution and width of the distribution for samples of 60–80 dots per film sheet. The mean and standard deviations were reported.

Haze Test

Haze is measured with the Gardner Model XL-211 Hazeguard hazemeter or equivalent instrument. The procedure is set forth in ASTM D 1003-61 (Reapproved 1977).

Color Density

Color density was measured using a Mac Beth TD504 transmission densitometer, equipped with status A filters (ANSO PH2.1-1952(R1969)). Measurements for the particular color under consideration were carried out by measuring the optical density of the sample with the complementary color filter in place, as follows: cyan sample:red filter, magenta sample:green filter, yellow sample:blue filter. Results were expressed in units of optical density.

Melt Viscosity

Melt viscosity was measured with a Rheometrics "RMS 605" dynamic oscillatory viscometer, following the standard procedures recommended by Rheometrics, at a strain rate of 5% and frequency of 1 radian per second. The results are reported in poise.

EXAMPLES Example 1

The image-receptive layer was prepared by combining in a jar, 7 kg of a 15% solid solution of Vitel PE 220 in a 50/50 methylethylketone (MEK)/toluene solvent with 7 kg of a 15% solids solution of polyoctadecyl carbamate-co-vinyl acetate having 50 mole % octadecyl-carbamate (hereinafter POCVA) in toluene, 1.5 kg MEK and 21 grams of Pergapak TM M2 (2.5μ molecular sieve). After mixing for about 30 minutes, 1 kg of isopropanol was slowly added to the mixture with stirring, prior to coating. The mixture was then coated onto a poly(ethylene terephthalate) film 75μ thick, which had been coated on the opposite side with an antistatic coating. The imaging layer is coated at a dry thickness of about 2μ, on a 180 Knurl rotogravure coater. The coating was dried in a preheated oven at 85° C. for 2 minutes. Haze measurement was performed on the finished receptor sheet prior to printing. The receptor sheet was then printed on a CalComp Colormaster 5902 printer. The half tone image density was measured along with dot size and the results are shown in Table 1. A photograph of the print sample is shown as FIG. 1.

EXAMPLE C1

Figure 2:
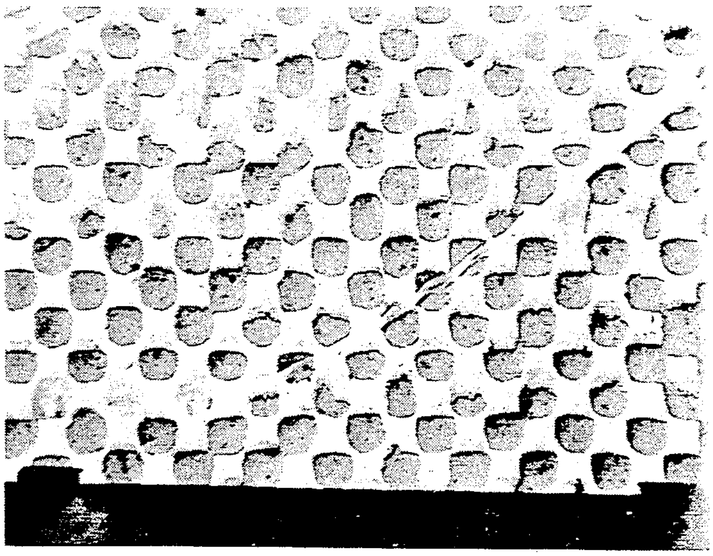
FIG. 2 shows a comparative receptor sheet which has been printed on the CalComp Colormaster 5902 in the same alternating cyan dot half tone pattern. This sheet uses as the image-receptive layer only the carrier polymer described in Example C1. As can be seen, the dots are fragmented, and indistinct. Some dots are completely missing.

This receptor sheet was made as described in Example 1 except that no POCVA was added. The results are shown in Table 1, and FIG. 2.

EXAMPLE 2

Figure 3:
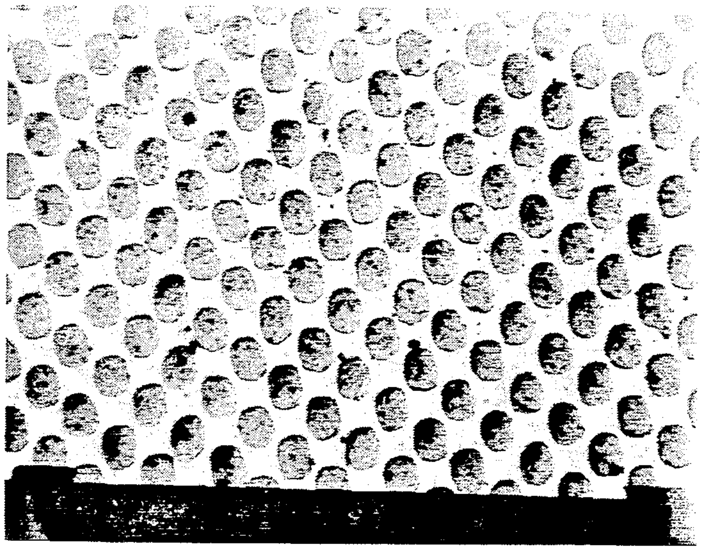
FIG. 3 shows a receptor sheet of the invention having been printed as described for FIG. 1. This image-receptor layer consists solely of an image-forming polymer as described in Example 2. Again, note the distinctness and separation of the dots, with no visible overprinting.

This receptor sheet was made as described in Example 1, except that 100% POCVA was used as the image-receptive layer, and the coating was accomplished using a Meyer #7 bar coater. The test results are shown in Table 1, and FIG. 3.

TABLE 1

| Ex. No. | Haze | Dot Size | Halftone Density | Melt Viscosity (Poise) 65° C. | 80° C. |
|---|---|---|---|---|---|
| 1 | <1% | 128 ± 11 | .24 | $2.1 \times 10^6$ | $2.1 \times 10^5$ |
| C1 | — | merged areas | .25 | | |
| 2 | 2.9% | 138 ± 12 | .26 | $2.1 \times 10^6$ | $2.1 \times 10^5$ |

EXAMPLES 3–4

Figure 4:
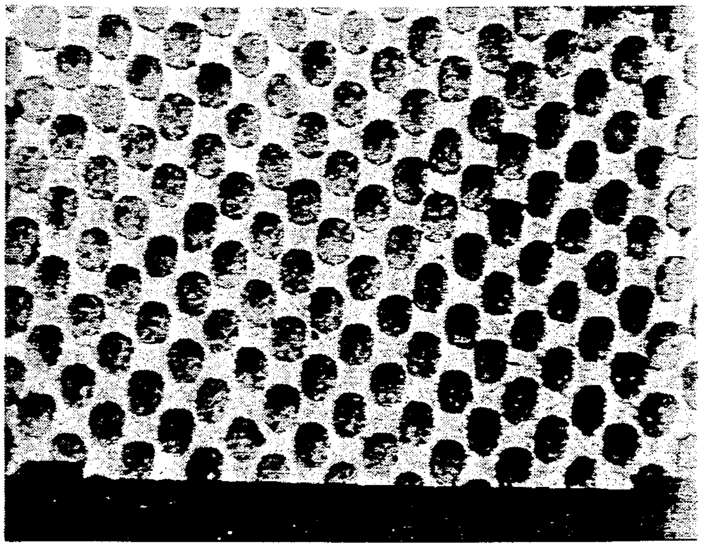
FIG. 4 shows a receptor sheet of the invention having been printed as described for FIG. 1. This image-receptor layer consists of an 50% of image-forming polymer, and 50% carrier polymer as described in Example 3. Again, note the distinctness and separation of the dots, with no visible overprinting.

These receptor sheets were made as described in Example 2 except that varying ratios of octadecyl- carbamate and PE 200 were used in a blend as the image-receptive layer and 50/50 xylene/toluene was used as solvent for POCVA. The compositions, and test results are shown in Table 2. Example 3 is depicted photographically in FIG. 4.

TABLE 2

| Ex. No. | Ratio (POCVA/PE 200) | Halftone Density | Haze |
|---|---|---|---|
| 3 | 50/50 | .25 | 22% |
| 4 | 20/80 | .24 | 16% |

EXAMPLES 5–8 AND 5C

Figure 6:
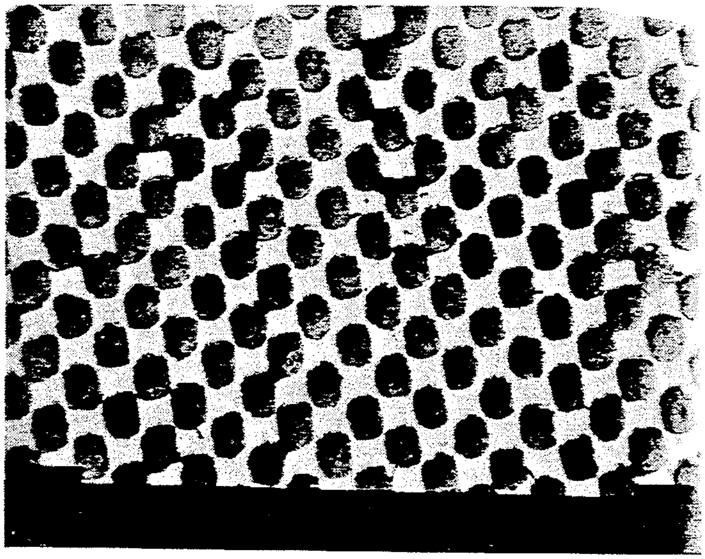
FIG. 6 shows a receptor sheet of the invention having been printed as described for FIG. 1. The image-receptive layer consists of 12.5% of an image-receptive polymer of the inventor, and 87.5% of the carrier polymer shown alone in FIG. 5, and described in Example 4. Note the decrease in overprinting, with most dots being distinct and separate. A small amount of overprinting is visible.

These receptor sheets were made as described in Example 3, except that a polymethyl methacrylate polymer (PMMA), available as Elvacite TM 2041 from DuPont was substituted for the PE 200. The compositions and test results are shown in Table 3. Examples 5, and 5C are depicted photographically in FIGS. 5 and 6, respectively.

TABLE 3

| Example No. | Ratio POCVA/ PMMA | Halftone Density | Haze Measuremt. | Dot Size |
|---|---|---|---|---|
| 5 | 12.5/ 87.5 | .24 | 8.0% | 141 ± 22 |
| 5C | 0/100 | .43* | 3.7% | 151 ± 29 |
| 6 | 25/75 | .26 | 6.1% | — |
| 7 | 50/50 | .26 | 7.4% | — |
| 8 | 6.25/ | .16 | 4.0% | 138 ± 36 |

TABLE 3-continued

| Example No. | Ratio POCVA/PMMA | Halftone Density | Haze Measuremt. | Dot Size |
|---|---|---|---|---|
| | 92.75 | | | |

*overprinted

EXAMPLES 9–13 AND 9C

These receptor sheets were made as described in Example 2, except that a vinylidene chloride acrylonitrile copolymer, available as Saran TM F310 from Dow Chemical Company, was used as the carrier polymer. Composition ratios and test results are shown in Table 4.

EXAMPLES 14–15

These receptor sheets were made as described in Example 1 except that alkyl carbamate-modified vinyl alcohol (available as "Peel Oil" from Aceto Corporation) was used in place of POCVA of Example 1 and in mixture with POCVA of Example 1 as specified in Table 4 at a dry coating thickness of 1.6μ using reverse roll coating. In Example 14, the melt viscosity of the mixture was $7.3\times10^7$ at 65° C. and $2.2\times10^6$ at 80° C. Test results are also shown in Table 4.

TABLE 4

| Example No. | Ratio F310/POCVA | Haze | Half-Tone Density | Dot Size |
|---|---|---|---|---|
| 9 | 87.5/12.5 | 3.7% | .24 | 142 ± 46 |
| 9C | 100/0 | 2.4% | .41* | 140 ± 22 |
| 10 | 75/25 | 2.6% | .23 | 139 ± 16 |
| 11 | 50/50 | 3.2% | .28 | — |
| 12 | 93.5/6.25 | 2.6% | .24 | 135 ± 22 |
| 13 | 96.9/3.1 | 3.3% | .24 | — |
| 14 | 0/100 | 3.9% | .12 | 104 ± 9 |
| 15 | 0/50/50** | 9.3% | .14 | — |

*overprinted
**a blend of "Peel Oil" and POCVA, with no F310

EXAMPLES 16–20

The acrylic copolymers used for the following examples were made by adding acrylic components, 0.14 g of thermal initiator, available as VAZO198 from DuPont and 110 g of ethyl alcohol to a 500 ml amber bottle equipped with a cap. The bottle and contents were then purged with nitrogen gas, followed by heating to 60° C. in a hot water bath. The temperature was maintained for 24 hours. The copolymers were then filtered and washed then diluted to about 10% solid solution in toluene. The specific acrylic compositions are shown in Table 5.

The receptor sheets were then coated with the above imaging layer using a #4 Meyer Rod. The coating was then dried in an oven for - minutes at -°C. The receptor sheet was then tested according to Example 1, except that the dot size measurement was done over a larger sample area than in Example 1. These data are reported in Table 5, along with a dot size measurement for example 1 using this larger sample area.

TABLE 5

| Ex. No. | Ratio* SMA | MMA | BMA | AA | EMA |
|---|---|---|---|---|---|
| 17 | 50 | 15 | 30 | 5 | — |

TABLE 5-continued

| Ex. No. | Ratio* SMA | MMA | BMA | AA | EMA |
|---|---|---|---|---|---|
| 18 | 60 | 10 | 25 | 5 | — |
| 19 | 47.7 | 47.7 | — | 4.7 | — |
| 20 | 47.7 | — | — | 4.7 | 47.7 |
| 21 | 47.7 | — | 47.7 | 4.7 | — |

*Components
SMA - stearyl methacrylate
MMA - methylmethacrylate
BMA - butylmethacrylate
AA - acrylic acid
EMA - ethylmethacrylate

EXAMPLE 21

This was made in the same manner as Example 14, except polyhexadecyl carbamate-co-vinyl acetate, or "PHCVA" was used in place of peel oil.

PHCVA was made by adding 10 g of poly(vinyl alcohol)-co-(vinyl acetate) to 80 g of xylene and refluxing at 140° C. to produce an azeotrope. We removed 12 grams of condensate to dehydrate the solution. 19.06 g of hexadecyl isocyanate was then added dropwise over a period of 15 minutes, followed by refluxing the resultant solution for 5 hours at 140° C. The solution was then diluted with toluene to produce a 4.44% solid coating solution (approximately 26.5% xylene and 63.5% toluene). The receptor sheet was then coated using a #9 Meyer Rod. The coating was then dried in a preheated oven.

Tests were carried out in the same manner as described in Example 16 and the results are shown in Table 6.

TABLE 6

| Ex. No. | Halftone Density | Haze | Dot Size (mm) | Melt Viscosity (Poise) 65° C. | 80° C. |
|---|---|---|---|---|---|
| 1 | .24 | <1% | 112.9 ± 6.5 | $2.1\times10^6$ | $2.5\times10^5$ |
| 16 | no over printing | <1% | 124.5 ± 7.1 | $1.4\times10^6$ | $2.1\times10^5$ |
| 17 | no over printing | <3% | 129.8 ± 5.4 | $7.4\times10^5$ | $4.7\times10^5$ |
| 18 | no over printing | <3% | 137.6 ± 5.3 | $4.7\times10^5$ | $2.7\times10^5$ |
| 19 | | <3% | too large | $2.1\times10^6$ | $1.4\times10^5$ |
| 20 | no over printing | <3% | 114.8 ± 9.1 | $1.1\times10^6$ | $7.7\times10^5$ |
| 21 | no over printing | <3% | 131.4 ± 4.9 | $3.5\times10^5$ | $2.2\times10^5$ |

EXAMPLE 22 Antistatic Polymer Synthesis

In a one liter, 4 necked round bottomed flask fitted with mechanical stirrer, condensor, dropping funnel and a thermometer, a charge comprising 175.0 g of Jeffamine Ed-900, available from Texaco Chemical Co, 65 g of triethylamine, 125 g of isopropyl ether, both available from Aldrich Chemical Inc. The flask was flushed with nitrogen gas. Then, with constant stirring 186.66 g if "Fluorad" Brand Sulfonyl Fluoride FX8, available from Minnesota Mining and Manufacturing was added dropwise during 60 minutes. After the completion of additions, the reactants were heated to reflux at 70° C. The heating was continued for 4–5 hours. The mixture turned from bright yellow to dark amber. The reactants were then cooled and neutralized with 1:1 HCL/water mixture, added very slowly.

75 cc of dichloromethane were added and the solution was washed in a separatory funnel with a 5% HCL solution, followed by two washings with D.I. water. The solution was stored over anhydrous sodium sulfate overnight. Solvent was then removed under vacuum. The overall yield of the product was in excess of 85%.

Image Receptor Sheet

A polyvinylidiene chloride emulsion (20.806 parts, 30% solids) was mixed with 0.312 part surfactant ("Triton" X-200) until uniform. The pH of the mixture was 1.38. As the mixture was stirred, sufficient ammonium hydroxide solution (28%) was added to raise the pH to 7.58. Deionized water and the 0.169 part of the antistatic polymer made above were then slowly added to the mixture.

The mixture was then knife coated onto one side of a 100 micrometer thick PET at a coating weight of 36 to 40 mg/ft$^2$.

The solution for the image receiving coating was applied to the reverse side with a rotogravure coater 120 line knurl. The coating weight was 0.16 g/ft$^2$. Haze was less than 5%, and the surface conductivity was $0.1\times10^{-8}$.

What is claimed is:

1. A thermal mass transfer imaging system incorporating a receptor sheet comprising a backing having coated thereon a polymeric image-receptive layer comprising at least about 5% of an image-receptive polymer having a melt-transition onset no higher than the melting point of a compatible donor sheet wax, and having a melt viscosity at the melt temperature of said donor sheet wax, of at least $1\times10^4$ poise.

2. A thermal mass transfer imaging system according to claim 1 wherein said image receptive polymer has a melt viscosity of at least $1\times10^5$ poise.

3. A thermal mass transfer imaging system according to claim 1 wherein said polymeric image-receptive polymer has the basic formula:

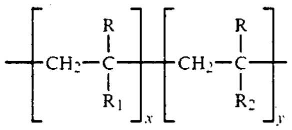

where R is selected from the group consisting of hydrogen, an alkyl group having 10 or fewer carbon atoms, an aryl group, and an alkyl substituted aryl group wherein the alkyl group has 10 or fewer carbon atoms, where $R_1$ is a pendant of group selected from the group consisting of

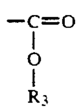
and
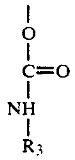

where $R_3$ is a long chain alkyl group having from about 14 to about 38 carbon atoms, where $R_2$ is selected from the group consisting of $R_1$,

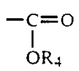
and
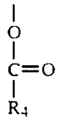

where $R_4$ is a short chain alkyl group having from 1 carbon atom to 15 carbon atoms.

where x, and y are numbers related in that x+y comprises 100% of the polymer; x is from about 25% to about 100% of the final polymer, and y is from 0% to about 75% of the final polymer.

4. A thermal mass transfer imaging system according to claim 1 wherein said image-receptive polymer is the basic formula:

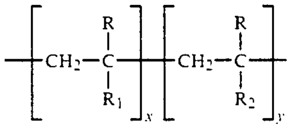

where R is selected from an alkyl group having 10 or fewer carbon atoms, an aryl group or alkyl substituted aryl group wherein the alkyl group has 10 or fewer carbon atoms, wherein $R_1$ is a pendant group selected from the group consisting of

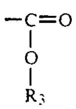
and
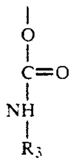

where $R_3$ is a long chain alkyl group having from about 14 to about 18 carbon atoms, where $R_2$ is selected from the group consisting of $R_1$,

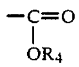
and
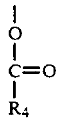

where $R_4$ is a short chain alkyl group having from 2 carbon atom to 15 carbon atoms, where x, and y are numbers related in that x+y comprises 100% of the polymer; x is from about 25% to about 100% of the final polymer, and y is from 0% to about 75% of the final polymer.

5. A thermal mass transfer imaging system according to claim 1 wherein said image-receptive polymer is copolymerized with at least one monomer selected from vinyl acetate, vinyl benzene, α-methyl vinyl benzene having the formula:

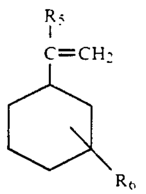

where $R_5$ represents hydrogen or $-CH_3$, and $R_6$ is selected from the group consisting of alkyl groups having up to 18 carbon atoms, halogen, hydroxide groups, alkoxy groups, acetyl groups and hydroxyalkyl groups.

6. A thermal mass transfer imaging system according to claim 1 wherein said image-receptive polymer is selected from the group consisting of octadecyl modified carbamates, and partially hydrolyzed octadecyl modified carbamates.

7. A thermal mass transfer imaging system according to claim 1 further comprising a carrier polymer for said image-receptive polymer.

8. A thermal mass transfer imaging system according to claim 7 wherein said carrier polymer is selected from the group consisting of copolyesters, polyvinyl butyral, polyvinylidene chloride, acrylonitrile, copolymer and polymethylmethacrylate.

9. A thermal mass transfer imaging system according to claim 8 wherein said carrier polymer is polymethylmethacrylate copolymer.

10. A thermal mass transfer imaging system according to claim 8 wherein said carrier polymer is a copolyester.

11. A thermal mass transfer imaging system according to claim 7 wherein the carrier polymer comprises from about 1% to about 95% of the image-receptive layer.

12. A thermal mass transfer imaging system according to claim 7 wherein the carrier polymer comprises from about 50% to about 91% of the image-receiving layer.

13. A thermal mass transfer imaging system according to claim 1 further comprising an antistatic polymer.

14. A thermal mass transfer imaging system according to claim 13 wherein the antistatic polymer is a cross-linked perfluoroalkylsulfonamidopolyether.

15. A thermal mass transfer imaging system according to claim 1 wherein said receptor sheet has a paper tab.

* * * * *

UNITED STATES PATENT AND TRADEMARK OFFICE

CERTIFICATE OF CORRECTION

PATENT NO. : 5,175,045

DATED : 12/29/92

INVENTOR(S) : Robert M. Henry, et al

It is certified that error appears in the above-identified patent and that said Letters Patent is hereby corrected as shown below:

On the Title Page insert information to indicate this patent is a Continuation-in-part of Ser. No. 07/593,685, October 5, 1990, abandoned.

On the Title Page, Line 3 in the Abstract, correct spelling "higehr" should read -- higher --

Column 3, Line 57, "inventor" should read -- invention --

Column 9, Line 58, "for - minutes at - °C" should read -- for 2 minutes at 158°C.--

Column 10, Line 44, in Ex.No. 19 "$1.4 \times 10^5$" should read -- $1.4 \times 10^6$ --

Column 10, Line 59, "if" should read -- of --

Column 11, line 54, "pendent of group" should read --pendant group--

Signed and Sealed this

Eighteenth Day of January, 1994

Attest:

BRUCE LEHMAN

*Attesting Officer* *Commissioner of Patents and Trademarks*